United States Patent
Parker et al.

(10) Patent No.: US 7,495,553 B2
(45) Date of Patent: Feb. 24, 2009

(54) METHOD OF INSTALLING A WIRELESS SECURITY SYSTEM

(75) Inventors: Patrick A Parker, Rochester, NY (US);
James E Berube, Farmington, NY (US);
Falk Herrmann, Fairport, NY (US);
Scott Wager, Canandaigua, NY (US);
Gunther Schwarz, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 11/174,886

(22) Filed: Jul. 5, 2005

(65) Prior Publication Data

US 2007/0008117 A1 Jan. 11, 2007

(51) Int. Cl.
*G08B 1/08* (2006.01)

(52) U.S. Cl. .......................... 340/539.21; 340/539.22; 340/514; 455/226.4

(58) Field of Classification Search ........ 340/539.21 X, 340/539.22 X, 539.26, 514, 692, 541, 506; 455/423, 191.1, 67.1, 136.1, 157.2, 226.1, 455/226.3, 226.7, 226
See application file for complete search history.

(56) References Cited

U.S. PATENT DOCUMENTS

| | | | | |
|---|---|---|---|---|
| 4,603,325 | A | * | 7/1986 | Marino et al. .......... 340/539.21 |
| 4,683,459 | A | * | 7/1987 | Edson ......................... 340/514 |
| 4,754,261 | A | * | 6/1988 | Marino ........................ 340/514 |
| 4,785,291 | A | | 11/1988 | Hawthorne ................. 340/573 |
| 5,257,007 | A | | 10/1993 | Steil et al. .................... 340/539 |
| 5,630,210 | A | * | 5/1997 | Marry et al. .............. 455/67.13 |
| 6,127,936 | A | | 10/2000 | Gendel et al. ................ 340/692 |
| 6,128,510 | A | | 10/2000 | Beukema et al. ............ 455/557 |
| 6,288,639 | B1 | * | 9/2001 | Addy ....................... 340/539.3 |
| 6,438,363 | B1 | * | 8/2002 | Feder et al. .............. 455/226.4 |
| 6,453,159 | B1 | | 9/2002 | Lewis ......................... 455/411 |
| 6,954,615 | B2 | * | 10/2005 | Sano ......................... 455/41.1 |
| 2002/0128006 | A1 | | 9/2002 | Martine et al. .............. 455/423 |
| 2003/0040279 | A1 | * | 2/2003 | Ballweg ....................... 455/66 |
| 2003/0050057 | A1 | | 3/2003 | Shirai ......................... 455/423 |
| 2004/0152419 | A1 | | 8/2004 | Lee ........................... 455/67.7 |
| 2004/0203433 | A1 | | 10/2004 | Najafi et al. .............. 455/67.11 |
| 2004/0203549 | A1 | | 10/2004 | Lee et al. | |
| 2004/0214610 | A1 | * | 10/2004 | Tanemura et al. ........... 455/566 |
| 2004/0217847 | A1 | | 11/2004 | Fries et al. | |
| 2004/0217859 | A1 | | 11/2004 | Pucci et al. | |
| 2005/0099289 | A1 | * | 5/2005 | Arita et al. ............... 340/539.1 |

FOREIGN PATENT DOCUMENTS

EP 1 515 463 A 3/2005
WO WO 03/061176 A 7/2003

OTHER PUBLICATIONS

Search Report for EP 06 01 2369 issued by the European Patent Office on Oct. 22, 2008.

* cited by examiner

*Primary Examiner*—Brent Swarthout
(74) *Attorney, Agent, or Firm*—Baker & Daniels LLP

(57) ABSTRACT

A method of installing a security system includes placing a security device at an installation location. An air-borne signal is transmitted to the security device. An indication of a quality of the signal as received by the security device is displayed on the security device.

21 Claims, 4 Drawing Sheets

METHOD OF INSTALLING A WIRELESS SECURITY SYSTEM

BACKGROUND OF THE INVENTION

1. Field of the Invention

The present invention relates to surveillance systems including wireless security devices, and, more particularly, to the installation of surveillance systems including wireless security devices.

2. Description of the Related Art.

Surveillance systems, also known as security systems, are known to include wireless security devices, such as wireless motion detectors, wireless door sensors, wireless window sensors, wireless smoke detectors, etc., for monitoring a secured area of space. The wireless devices each bi-directionally communicate with a central controller via radio frequency (RF) signals or some other type of wireless and/or air-borne signals. Obviously, the performance of the security system is largely dependent upon each of the wireless security devices having strong reception of the RF signals transmitted by the central controller to the wireless security devices. Thus, each wireless device in use by a security system must be installed at a location where such strong RF signal reception is possible. That is, the wireless devices must be installed at locations that are free of electromagnetic shielding and other conditions that may cause poor radio frequency reception.

The identification of locations that yield good radio reception involves some trial and error. Typically, the central controller is installed at a location that is convenient for the user, and the wireless devices are mounted at locations where the detection of intruders is needed. Although some consideration may be given to the RF reception between the central controller and the wireless devices, the detection of intruders is the primary factor in deciding where to mount the wireless devices. After the wireless devices have been mounted, the installer walks to the central controller and operates the system in order to determine, among other things, whether the RF reception of the wireless devices at the mounting locations is acceptable. If not, the wireless devices are relocated and the process is repeated until an acceptable level of RF reception by the wireless devices is achieved. A problem with this approach is that mounting the wireless devices, even temporarily, is time consuming and typically requires holes to be drilled in the walls. Thus, each time a wireless device is relocated, the holes and other wall damage from a previous mounting must be repaired. Another problem is that the installer must return to the central controller each time the RF reception at a new location of a wireless device is to be tested. The walking back and forth between the relocated wireless-devices and the central controller is a time-consuming aspect of the installation of the surveillance system.

Another problem is the adequacy of the location of the central controller for RF communication with mobile wireless devices, such as panic devices and keyfobs, is rarely tested. Such testing would require a first installer to walk around the premises while activating the mobile wireless device, and a second installer to man the central controller and monitor the changing quality of RF reception. Thus, the location of a central controller is typically chosen for the convenience of the user without any testing of its suitability for RF reception.

What is needed in the art is a method of installing a wireless security system without the installer having to mount the wireless devices on walls in order to test the RF reception of the wireless devices at the mounting locations. What is also needed is a method of installing a wireless security system without the installer having to repeatedly walk between the mounting locations and the central controller in order to test the RF reception of the wireless devices at the mounting locations. What is further needed is a method of easily testing the RF reception characteristics of a location of a central controller.

SUMMARY OF THE INVENTION

The present invention provides a method of installing a wireless security system including using a wireless security device to present a visual indication of the quality of RF reception between the system hub and the wireless device at various potential mounting locations of the wireless device. Thus, the wireless security device may be carried by an installer to various possible mounting locations, and the wireless device may provide an immediate visual indication of the suitability of each of the mounting locations from an RF reception perspective. Moreover, the wireless security device may be carried around the secured premises by an installer in order to test the RF reception characteristics of the location of the central controller.

The invention comprises, in one form thereof, a method of installing a security system, including placing a security device at an installation location. An air-borne signal is transmitted to the security device. An indication of a quality of the signal as received by the security device is displayed on the security device.

The invention comprises, in another form thereof, a method of installing a security system, including providing a security device having a light-emitting element. The security device is placed at a potential mounting location. A radio frequency signal is transmitted to the security device. The light emitting element is operated dependent upon a level of reception of the signal by the security device.

The invention comprises, in yet another form thereof, a method of installing a security system, including providing a security device having an alphanumeric display. The security device is placed at a potential mounting location. A radio frequency signal is transmitted to the security device. A quality of the signal as received by the security device is indicated on the alphanumeric display.

An advantage of the present invention is that the potential RF performance of the wireless security devices at individual mounting locations may be verified prior to drilling holes at the locations and prior to actually mounting the wireless devices at the locations.

Another advantage is that the present invention eliminates the need to relocate a wireless security device after discovering that the initial location does not allow a suitable communications link.

Yet another advantage is that the present invention reduces the need for installation personnel to make return trips to installation sites to troubleshoot devices that were installed with borderline performance levels.

Still another advantage is that the present invention enables an installer to easily test RF reception characteristics of a central controller location vis-a-vis a mobile wireless device that is carried around the premises.

A further advantage is that the present invention enables troubleshooting of communications problems at sites where the RF environment may have been altered in such a way as to cause RF performance to deteriorate.

Still yet another advantage is that the wireless device may be used to survey the levels of RF reception at the various potential mounting locations of an entire site prior to the arrival of installation personnel. Thus, desirable mounting locations may be predetermined, thereby reducing installation time.

A still further advantage is that the wireless device could be used as a sales aid to demonstrate the benefits and feasibility of a wireless installation.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
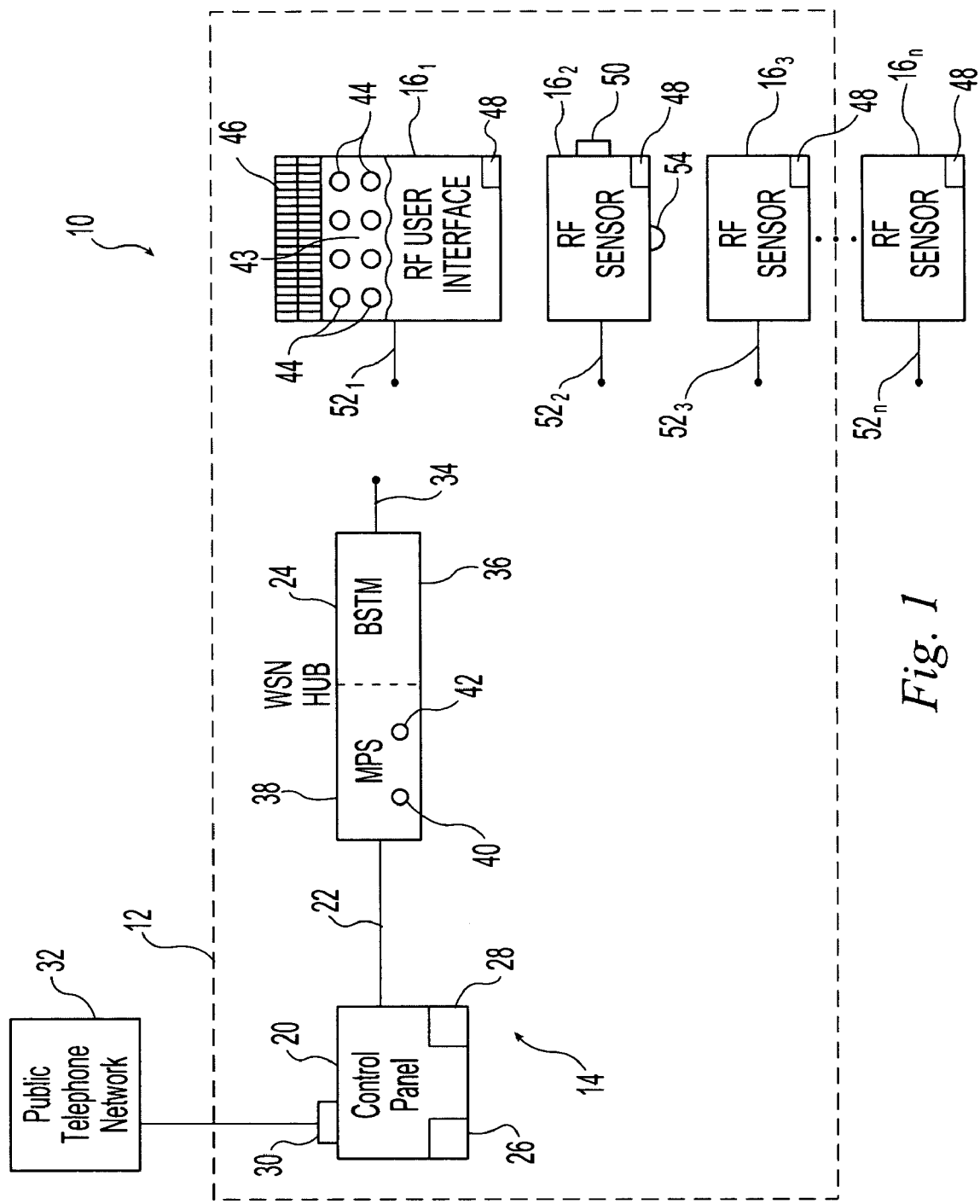
FIG. 1 is a block diagram of one embodiment of a security system of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings and particularly to FIG. 1, there is shown one embodiment of a security system 10 of the present invention for a structure 12 such as a building. However, system 10 may be used to secure other spaces, such as outdoor areas, subterranean rooms and passages, and zones of air space. System 10 includes a system controller 14, and wireless security devices $16_1$ through $16_n$.

System controller 14 includes a control device in the form of a control panel 20 electrically connected via an option bus 22 to a wireless sensor network (WSN) hub 24 or "base station". Control panel 20 may include a processor 26, a memory device 28 and a telephone interface 30. Processor 26 may coordinate communication with various system components including WSN hub 24. Memory 28 may include software for interpreting signals from wireless devices 16 and deciding based thereon whether to transmit an alarm signal from control panel 20. The alarm signal may be used to activate an audible alarm (not shown) within building 12, or to notify a central station receiver (CSR) (not shown) such as a security company, fire station, or police station, for example, via public telephone network 32.

WSN hub 24 may include an antenna element 34, a base station transceiver module (BSTM) 36 and a multi-point switch (MPS) 38. MPS 38 may include switches 40, 42 for setting an operating mode and a transmission signal strength, respectively, of BSTM 36. Each of switches 40, 42 may be in the form of a dial. Antenna element 34 may transmit and receive air-borne signals, such as radio frequency signals. The radio frequency signals may be received by and transmitted from, i.e., exchanged with, wireless devices 16. Information from wireless devices 16 may be passed by WSN hub 24 to control panel 20 via option bus 22. Control panel 20 may pass information to WSN hub 24 via option bus 22 for transmission to wireless devices 16 as necessary.

Wireless device $16_1$ may be in the form of a user interface including a keypad 43, an alphanumeric display 46, and an antenna element $52_1$. Keypad 43 may include pushbuttons 44, most of which may individually correspond to a respective alphanumeric character, as is well known. Others of pushbuttons 44 may be depressed for notifying police, a fire department, or a security company via public telephone network 32, as is also well known. Pushbuttons 44 may be actuated by a user in order to arm, disarm, and program security system 10. In one embodiment, display 46 includes a two by sixteen character liquid crystal diode display (LCD). Antenna element $52_1$ may allow user interface $16_1$ to exchange RF signals with WSN hub 24.

User interface $16_1$ may function as an installation tool as well as an operational interface for a user of security system 10. More particularly, user interface $16_1$ may function as an RF link analysis tool, as described in more detail below.

Wireless devices $16_2$ through $16_n$ may be in the form of any number or combination of window sensors, door sensors, motion detectors, smoke detectors, panic devices, gas detectors and keyfobs, for example. Window sensors and door sensors may detect the opening and/or closing of a corresponding window or door, respectively. Panic devices may be in the form of devices that human users keep on their person, and that are to be used to summon help in an emergency situation. Gas detectors may sense the presence of a harmful gas such as carbon monoxide, or carbon dioxide. A keyfob may be used to arm or disarm security system 10, and is another device that a user may possibly keep on his person. Panic devices and keyfobs are types of wireless devices that a user may carry around the premises, i.e., building 12, and manually activate at any time for communication with WSN hub 24.

Each wireless device 16 may include a respective antenna element 52 for transmitting and receiving air-borne signals, such as radio frequency signals. The radio frequency signals may be received by and transmitted from, i.e., exchanged with, WSN hub 24. Wireless devices $16_1$, $16_2$ and $16_3$ are indicated in FIG. 1 as being disposed inside building 12, and wireless device $16_n$ is indicated in FIG. 1 as being disposed outside building 12. However, any number of wireless devices 16 may be disposed within building 12, and any number of wireless devices 16 may be disposed outside building 12. Types of wireless devices that may be permanently or temporarily disposed outside of building 12 during installation or operation may include motion detectors, panic devices and keyfobs.

Wireless devices $16_1$ through $16_n$ may each include an RF module 48 that provides access to data related to the reception quality of the RF communications environment. During normal operation of security system 10, this reception data may be used by wireless devices 16 to monitor the integrity of the RF link between each device 16 and WSN hub 24.

RF sensor $16_2$ may function as an installation tool as well as an operational sensor component of security system 10. More particularly, RF sensor $16_2$, similarly to user interface $16_1$, may function as an RF link analysis tool, as described in more detail below. RF sensor $16_2$ may include a tamper pushbutton 50 and a light-emitting element in the form of a light-emitting diode (LED) 54 which enable RF sensor $16_2$ to function as an RF link analysis tool.

During installation, some types of wireless devices 16 may be mounted or hung in a permanent or semi-permanent desired location. Examples of such types of wireless devices 16 may include window sensors, door sensors, motion detectors, smoke detectors, and gas detectors. Other types of wireless devices 16 may be disposed in temporary locations during installation, or may even be mobile, i.e., in motion, such as a panic device or keyfob being carried on a user's person.

To begin the installation, a human installer positioned within building 12 may position system controller 14, including WSN hub 24, in a desired location that is convenient for the user, such as in a closet or basement. The installer may actuate switch 40 in order to place BSTM 36 in a Signal Strength Mode in which BSTM 36 may repetitively transmit RF test signals for reception by wireless devices 16. The strength of the RF test signals as received by a wireless device 16, after having been transmitted from WSN hub 24, may be evaluated by RF module 48 of the wireless device. Instead of, or in addition to, evaluating the strength of the received test signals, RF module 48 may evaluate the signal-to-noise ratio or some other quality of the received signal.

Additionally different grades of security may require different margins. It is therefore possible to determine whether signal strength exceeds an acceptable threshold level for a particular device with a particular grade of security. A device would therefore use its ability to adjust power transmission levels in order to tailor the signal strength mode operation to specific security grades.

The strength of the RF signals transmitted by WSN hub 24 may be comparable to the strength of the RF signals transmitted by wireless devices 16. Thus, the quality of the RF signal as received by a wireless device 16 at a particular location may be a good proxy for the quality of an RF signal as received by WSN hub 24 from a wireless device 16 at the particular location.

Wireless devices $16_1$, $16_2$ may be used as installation tools to evaluate the quality of the RF test signal received by a wireless device from WSN hub 24. In one embodiment, wireless devices $16_1$, $16_2$ may be used as installation tools before they have been "discovered" by system controller 14, i.e., before their configuration or identification data has been stored in memory 28. More particularly, the installer may temporarily place one of wireless devices $16_1$, $16_2$ at a potential permanent installation location of one of the wireless devices 16. For example, the installer may identify a particular location on a wall at which a motion detector may be well positioned to sense motion in an area that needs to be monitored. The installer may then temporarily place one of wireless devices $16_1$, $16_2$ at the identified location on the wall, such as by adhesion or by use of suction cups. It is also possible for the installer to merely hold one of wireless devices $16_1$, $16_2$ at the identified location while the wireless device evaluates the quality of the received RF signal.

In order to place wireless user interface $16_1$ in a Signal Strength Mode in which wireless device $16_1$ evaluates the quality of the RF test signal it receives from WSN hub 24, the installer may actuate a particular sequence or set of pushbuttons 44 on user interface $16_1$. Similarly, in order to place wireless sensor $16_2$ in a Signal Strength Mode, the installer may actuate tamper button 50 in a particular sequence and for particular time periods. In one embodiment, tamper button 50 and/or pushbuttons 44 must be actuated in the particular manners within ten seconds of inserting batteries in the wireless device so as to prevent the installer from inadvertently putting the wireless device in the Signal Strength Mode.

Figure 2:
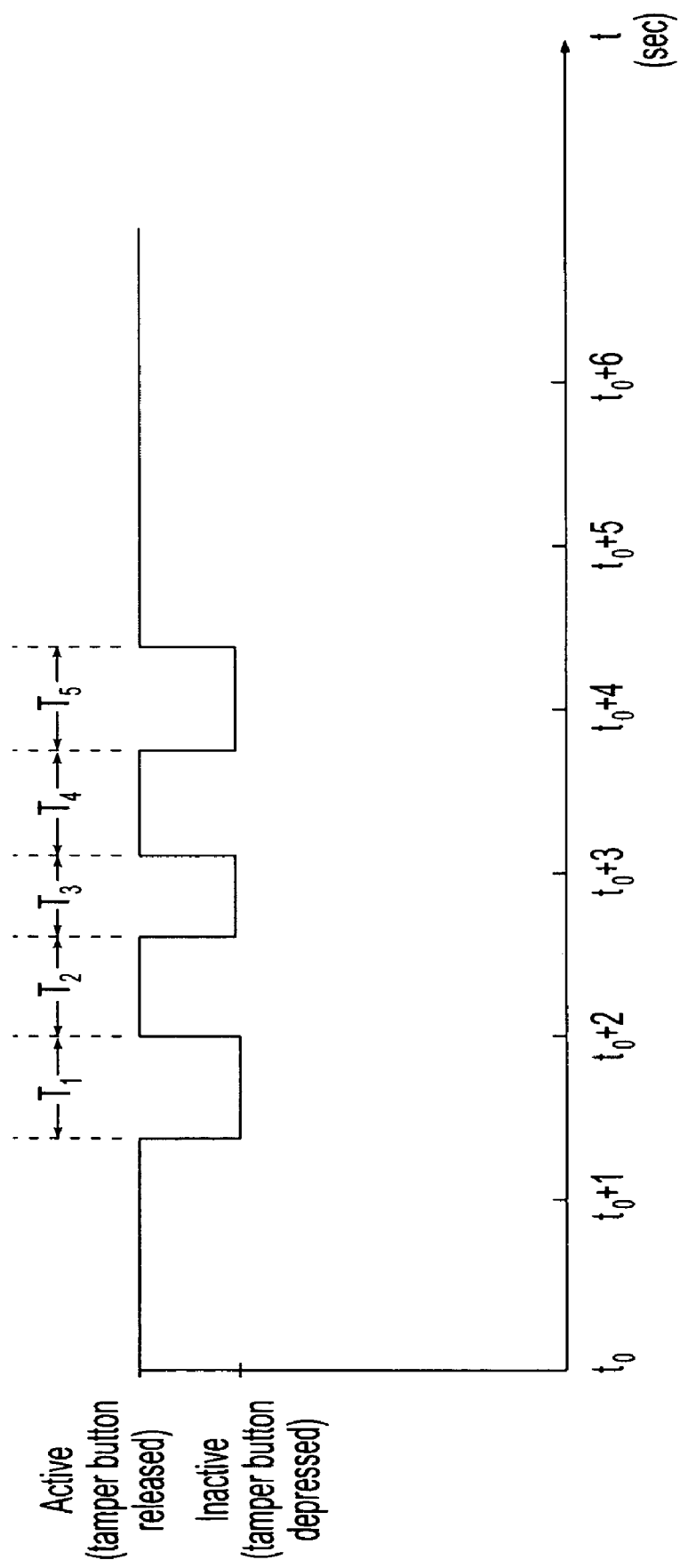
FIG. 2 is a plot of one embodiment of a tamper button sequence to place an RF sensor of FIG. 1 in a signal strength mode.

FIG. 2 illustrates one embodiment of a sequence in which tamper button 50 may be actuated in order to place wireless sensor $16_2$ in a Signal Strength Mode. In this embodiment, the installer begins at time t0 with tamper button 50 released. The installer then alternately deactivates a tamper switch (not shown) within wireless sensor $16_2$ by depressing tamper button 50, and activates the tamper switch by releasing tamper button 50. Tamper button 50 may be depressed three times in succession to place wireless sensor $16_2$ in a Signal Strength Mode. Specifically, time periods T1, T3, T5 during which tamper button 50 is depressed, and time periods T2, T4 during which tamper button 50 is released, may all be approximately between 250 milliseconds and 750 milliseconds in duration.

Wireless sensor $16_2$ may be in the Signal Strength Mode for a period of approximately ten minutes from the time at which wireless sensor $16_2$ was placed in the mode via the above-described sequence of depressions of tamper button 50. Wireless sensor $16_2$ may return to normal operation after the ten minute time period or after the batteries (not shown) are removed from the sensor and then put back in.

In one embodiment, user interface $16_1$ may be placed in a Signal Strength Mode by simultaneously depressing three of pushbuttons 44. User interface $16_1$ may then remain in the Signal Strength Mode for a time period of approximately thirty minutes, or until the batteries (not shown) are removed. User interface $16_1$ may then return to normal operation after the thirty minute time period or when the batteries are put back in.

Figure 3:
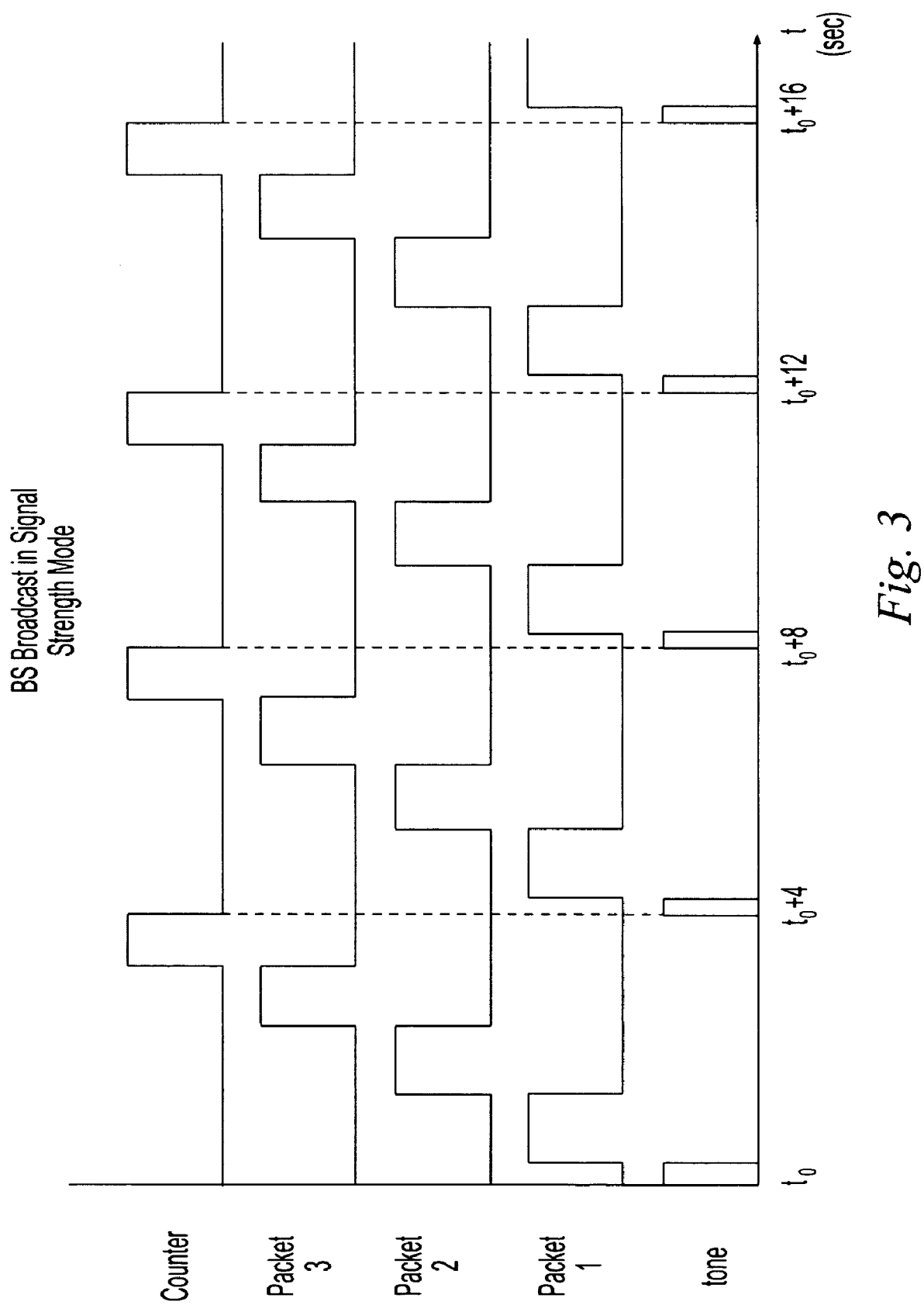
FIG. 3 is a timing chart of one embodiment of an RF broadcast signal transmitted by the base station of FIG. 1 in the signal strength mode.

In one embodiment, when the installer actuates switch 40 in order to place WSN hub 24 in the Signal Strength Mode, MPS 38 may send a Change Operating Mode data packet to BSTM 36. Upon entering the Signal Strength Mode, BSTM 36 may broadcast an RF signal as indicated in FIG. 3. More particularly, BSTM 36 may broadcast a set of three data packets, i.e., Packet 1, Packet 2 and Packet 3, preceded by a tone of approximately 200 millisecond duration every four seconds. During each four second cycle, a counter may be incremented. The strength or magnitude of the RF signal broadcast by BSTM 36 in the Signal Strength Mode may be adjusted by the installer by actuating switch 42. BSTM 36 may continue to broadcast the signal illustrated in FIG. 3 until the installer disconnects the power source, changes the switch 40 settings and reconnects the power source to thereby switch WSN hub 24 out of the Signal Strength Mode. At this point, MPS 38 may send another Change Operating Mode data packet to BSTM 36, which causes BSTM 36 to perform a reset or switch out of the Signal Strength Mode and perhaps into a normal mode of operation.

After wireless user interface $16_1$ or wireless sensor $16_2$ have been placed in the Signal Strength Mode via one of the particular keystroke entries described above, the wireless device may measure the noise level based on a predefined number of samples. The wireless device then performs an rfwakeup command which readies the wireless device for receiving the signal of FIG. 3 that is broadcast by BSTM 36 while in the Signal Strength Mode. After the wireless device receives a first set of signal strength packets, i.e., Packet 1, Packet 2 and Packet 3, the wireless device may sample for additional signal strength packets at intervals of four seconds. That is, upon receiving the first set of signal strength packets, the wireless device wakes up every four seconds in order to receive the next set of packets.

The wireless device, i.e., wireless user interface $16_1$ or wireless sensor $16_2$, may compute an average of the received signal strength of the packets and may measure the noise level after receiving a set of three packets to compute the running average of the noise level. The wireless device may indicate signal quality (level of reception of the signal) based upon the average signal strength of the packets, the noise level, and the packet success rate, i.e., the percentage of data packets that were successfully received. If the wireless device does not receive the next set of packets, the device moves into rfwakeup mode and waits for the tone of a signal strength packet.

If the wireless device receives all three data packets within a four second interval, and if the signal-to-noise ratio is above a certain threshold level, as determined by RF module 48, then the signal strength or signal quality may be deemed to be acceptable for the present location of the wireless device. Thus, a selected one of wireless devices 16 that is operationally suitable for the location that was verified by wireless user interface $16_1$ or wireless sensor $16_2$ may be mounted or otherwise permanently installed at the verified location. For example, if the verified location is on a wall with a view of an area to be monitored for motion, then one of wireless devices 16 that is in the form of a motion detector may be installed at the verified location. If wireless sensor $16_2$ is operable as a motion detector, then wireless sensor $16_2$ may be permanently installed at the verified location. If the verified location is associated with a window, then one of wireless devices 16 that is in the form of a window sensor may be permanently installed at the verified location. If the verified location is associated with a door, then one of wireless devices 16 that is in the form of a door sensor may be permanently installed at the verified location. If the verified location is adjacent to an-entrance door of building 12, then wireless user interface $16_1$ may be permanently installed at the verified location.

Conversely, if the wireless device, i.e., wireless user interface $16_1$ or wireless sensor $16_2$, does not receive all three data packets within a four second interval, or if the signal-to-noise ratio is not above a certain threshold level, as determined by RF module 48, then the signal strength or signal quality may be deemed to not be acceptable for the present location of the wireless device. Thus, another potential location for a wireless device may be chosen, wireless user interface $16_1$ or wireless sensor $16_2$ may be temporarily placed at the chosen location, WSN hub 24 and one of wireless user interface $16_1$ and wireless sensor $16_2$ may be placed in the Signal Strength Mode, and the verification process may be repeated for the new location.

Wireless user interface $16_1$ and wireless sensor $16_2$ may provide the installer with a visual indication of whether the signal quality and RF reception is acceptable. More particularly, wireless sensor $16_2$ may flash, i.e., turn ON and OFF, LED 54 in a specific sequence to thereby indicate whether the strength of the received signal is acceptable or unacceptable. In one embodiment, the specific sequence is repeated every four seconds. For example, every four seconds LED 54 may be turned ON for one long blip of 750 millisecond duration to thereby indicate that wireless sensor $16_2$ is in the Signal Strength Mode, but that either not all of the three data packets were received, or the received signal was of unacceptable strength. On the other hand, in order to indicate that the received signal was of acceptable strength, every four seconds LED 54 may be turned ON for three short blips that are of 250 millisecond duration and that are separated by OFF periods also having a 250 millisecond duration.

Wireless user interface $16_1$ may use LCD display 46 to indicate the quality of the received signal. In one embodiment, user interface $16_1$ has three different display modes in which signal strength information may be provided in three different, respective levels of detail. In a first of the display modes, LCD display 46 displays either the message "Acceptable signal strength" or the message "Unacceptable signal strength". In a second of the display modes, in addition to the above two messages, LCD display 46 displays the packet success rate, and the average of the received signal strength. In a third of the display modes, in addition to everything displayed in the second display mode, LCD display 46 displays the ambient noise level based on an average of ten samples, wherein each sample is taken immediately after a set of data packets is received.

Figure 4:
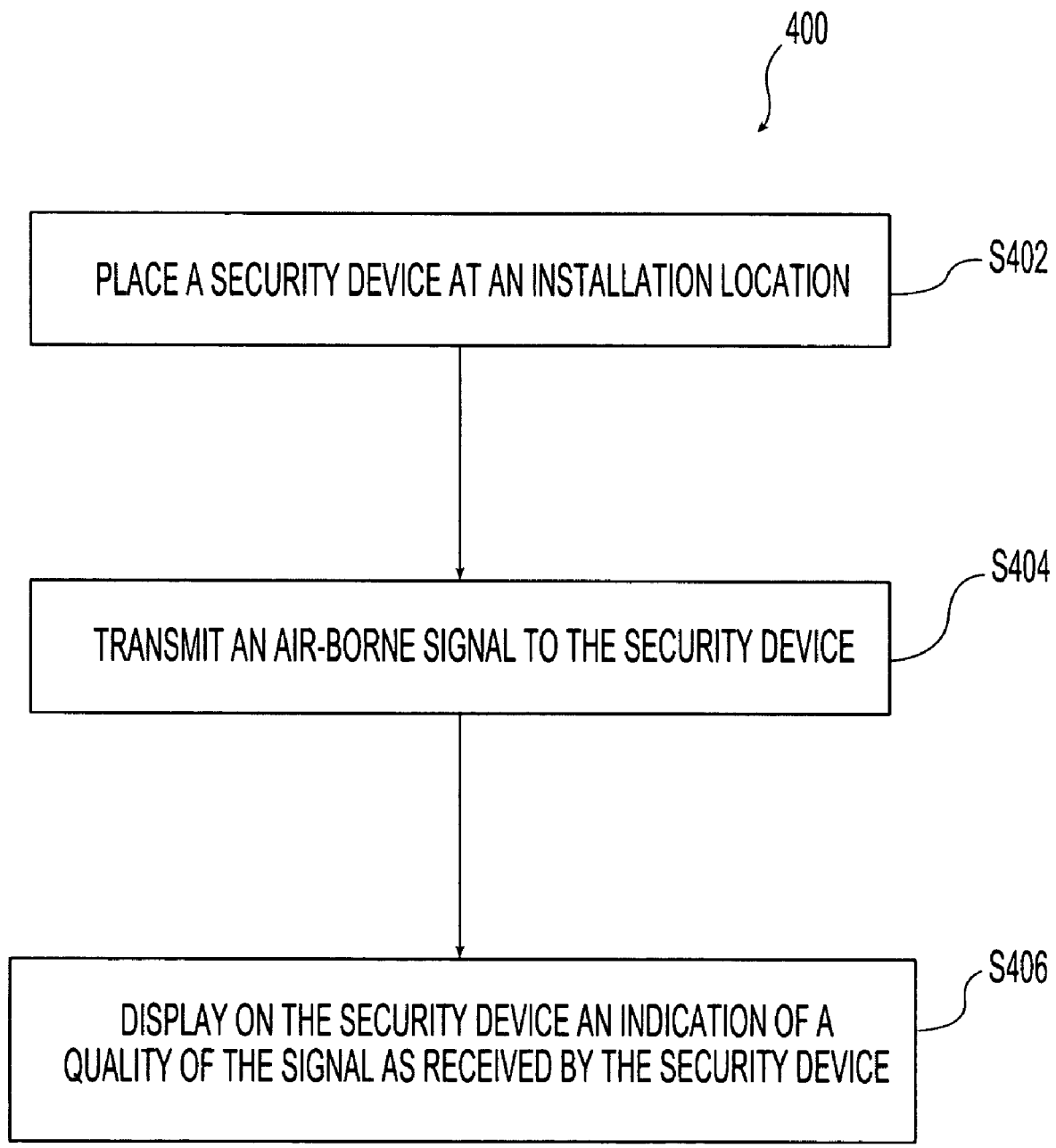
FIG. 4 is a flow chart of one embodiment of a security system installation method of the present invention.

One embodiment of a method 400 of the present invention for installing a security system is shown in FIG. 4. In a first step S402, a security device is placed at an installation location. For example, a security device such as wireless user interface $16_1$ or wireless sensor $16_2$ may be temporarily placed at a potential mounting location for a wireless device. Such a potential mounting location may be on a wall or may be associated with a window or door, depending upon the function of the wireless device for which an installation location is sought. In a second step S404, an air-borne signal is transmitted to the security device. For example, WSN hub 24 may transmit the RF signal illustrated in FIG. 3 while controller 14 is in the Signal Strength Mode. Wireless user interface $16_1$ or wireless sensor $16_2$ may receive the RF signal transmitted by WSN hub 24. In a final step S406, an indication of a quality of the signal as received by the security device is displayed on the security device. For example, LED 54 or display 46 may be used to display an indication of whether the RF signal as received by wireless user interface $16_1$ or by wireless sensor $16_2$ is of acceptable signal strength.

In addition to verifying an installation location for a wireless device 16, wireless user interface $16_1$ and wireless sensor $16_2$ may be used to verify an installation location of system controller 14 in terms of its suitability for bi-directional RF communication with a mobile wireless device, such as a panic device or a keyfob. More particularly, after temporarily installing controller 14 at a prospective location, WSN hub 24 and one of wireless user interface $16_1$ and wireless sensor $16_2$ may be placed in Signal Strength Modes as described above. The wireless device may then be carried around the premises, and the installer may monitor the received signal quality as indicated by LED 54 or display 46. If the quality of the received signal is unacceptable, the installer may move controller 14 to another prospective location and again test the quality of signals received by a wireless device while walking around the premises. When the received signals are of acceptable quality, the installer may then permanently install controller 14 at its present location.

While this invention has been described as having an exemplary design, the present invention may be further modified within the spirit and scope of this disclosure. This application is therefore intended to cover any variations, uses, or adaptations of the invention using its general principles.

What is claimed is:

1. A method of installing a security system, said method comprising the steps of:
    placing a security device at an installation location for a security sensor configured to sense at least one of a security breach and a harmful condition;
    transmitting an air-borne signal to said security device located at the installation location of the security sensor;
    evaluating a quality of the air-borne signal received by the security device;
    displaying on said security device an indication of whether or not the quality of the signal as received by said security device is acceptable based on the evaluating step; and
    mounting a security sensor at the installation location if the display indicates that the quality of the signal received by said security device is acceptable.

2. The method of claim 1 wherein the air-borne signal comprises a radio frequency signal.

3. The method of claim 1 wherein the air-borne signal is transmitted from a wireless sensor network hub.

4. The method of claim 1 wherein said security device includes a light-emitting element, said displaying step including flashing said light-emitting element ON and OFF dependent upon the quality of the signal as received by said security device.

5. The method of claim 4 wherein the step of mounting said security sensor at the installation location is performed if the quality of the signal exceeds a threshold level.

6. The method of claim 1 wherein said evaluating step includes determining at least one of a signal strength and a signal-to-noise ratio of the signal as received by said security device.

7. The method of claim 1 wherein said security device comprises a user interface including an input device, a display and an antenna element.

8. The method of claim 1 wherein said security device is the security sensor, the security sensor comprising at least one of a window sensor, a door sensor, a motion detector, a smoke detector, and a gas detector.

9. The method of claim 1 wherein said security device includes a visible display element.

10. The method of claim 9 wherein said visible display element comprises an alphanumeric display.

11. The method of claim 1 wherein said security device is able to adjust transmission power levels to thereby tailor the signal strength mode operation to a predetermined security grade.

12. A method of installing a security system, said method comprising the steps of:

providing a security device including an alphanumeric display;

placing said security device at a potential mounting location for a security sensor configured to sense at least one of a security breach and a harmful condition;

transmitting a radio frequency signal to said security device;

evaluating a quality of the air-borne signal received by said security device;

indicating on said alphanumeric display whether or not the quality of the signal as received by said security device is acceptable based on the evaluating step; and mounting a security sensor at the potential mounting location if the alphanumeric display indicates that the quality of the signal received by said security device is acceptable.

13. The method of claim 12 wherein the radio frequency signal is transmitted from a wireless sensor network hub.

14. The method of claim 12 comprising the further step of mounting said security device at the potential mounting location if the quality of the signal exceeds a threshold level.

15. The method of claim 12 wherein said indicating step includes determining at least one of a signal strength and a signal-to-noise ratio of the signal as received by said security device.

16. The method of claim 12 wherein said security device comprises a user interface including an input device, a display and an antenna element.

17. The method of claim 16 wherein said second security device comprises at least one of a window sensor, a door sensor, a motion detector, a smoke detector and a gas detector.

18. The method of claim 1 further comprising switching the security device from a normal operation mode to a signal strength test mode prior to the evaluating step.

19. The method of claim 18 further comprising switching the security device back to the normal operation mode after the displaying step.

20. The method of claim 12 further comprising switching the security device from a normal operation mode to a signal strength test mode prior to the evaluating step.

21. The method of claim 20 further comprising switching the security device back to the normal operation mode after the indicating step.

* * * * *